United States Patent [19]
Lover et al.

[11] 3,887,712
[45] June 3, 1975

[54] ORAL HYGIENE PRODUCTS

[75] Inventors: Myron J. Lover, Mountainside; Joseph P. Speranza, Clark, both of N.J.

[73] Assignee: Merck & Co., Inc., Rahway, N.J.

[22] Filed: June 15, 1973

[21] Appl. No.: 370,481

[52] U.S. Cl. .................................. 424/326; 424/52
[51] Int. Cl. ............................................. A61k 7/16
[58] Field of Search ........................ 724/52, 54, 326

[56] References Cited
UNITED STATES PATENTS
3,413,326 11/1968 Schmid ................................ 424/52
3,562,385 2/1971 Block et al. ........................... 424/54
3,758,689 9/1973 Rapfogel .............................. 424/54

FOREIGN PATENTS OR APPLICATIONS
825,577 12/1959 United Kingdom .................. 424/54

*Primary Examiner*—Richard L. Huff
*Attorney, Agent, or Firm*—William H. Nicholson; Harry E. Westlake, Jr.

[57] ABSTRACT

Alexidine dihydrofluoride is useful in the treatment of dental plaque, calculus, gingivitis, caries and related periodontal disease.

1 Claim, No Drawings

ORAL HYGIENE PRODUCTS

This invention is concerned with the use of alexidine dihydrofluoride in oral hygiene preparations for the prevention of dental plaque, calculus, gingivitis, caries, and related periodontal disease and with oral hygiene formulations employing alexidine dihydrofluoride as active ingredient.

Alexidine dihydrofluoride has the following structural formula:

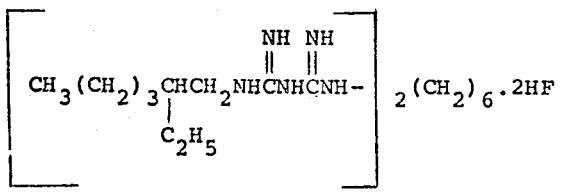

and chemically is 1,6-bis(2-ethylhexylbiguanido)hexane, dihydrofluoride.

The exact etiology of dental caries is not known with precision and probably results from a multiplicity of factors. It is, however, well established that caries is intimately involved with dental plaque and calculus, and that fluorides play an active role in the prevention of caries, rendering tooth enamel less susceptible to solubilization by the low pH of the plaque milieu.

Traditionally, fluorides have been employed for tooth care as soluble inorganic fluorides to be taken internally such as in the drinking water; as relatively insoluble inorganic fluoride salts such as stannous fluoride in tooth paste formulations; or as applied directly to the teeth by a dentist. More recently, it has been found that certain organic amine hydrofluoride acid addition salts are at least as effective in the prevention of dental caries, as the inorganic fluorides. However, these agents in the concentrations used have little or no effect on the formulation of dental plaque.

In the prevention of dental plaque, calculus, and associated periodontal disease, the use of alexidine dihydrochloride in oral hygiene formulations has been shown to be very effective and concomittantly to have an effect on the incidence of dental caries to the extent that caries is a result of plaque deposition. But this material did not serve to protect against dental caries by the mechanism in which fluorides have been shown to be active.

The present invention provides an agent effective in the prevention of dental caries through the dual mode of attack; by preventing plaque and calculus, and by providing fluoride ion.

One of the important features of alexidine dihydrofluoride which makes it a particularly useful agent for the intended utility is its unexpectedly high solubility in aqueous media. This provides for great flexibility in formulation parameters. For example, the high solubility permits the preparation of concentrates for use in hydraulic jet oral irrigation devices, mouth wash concentrates, or in hypertonic or isotonic or heavily buffered solutions where less soluble salts would be precipitated. The high aqueous solubility is also a decided manufacturing convenience and hence an economical advantage in the production of these oral hygiene formulations.

The surprising solubility of alexidine dihydrofluoride is demonstrated by the following table.

| Compound | % Solubility in H$_2$O (w/v) |
|---|---|
| Alexidine . 2HF | 44% |
| Alexidine . 2HCl | 0.27% |
| Chlorhexidine . 2HF | 1% |

The last compound in the table, chlorhexidine.2HF, has been suggested in British Patent No. 825,577, as useful in dentifrices, but the corresponding diacetate or digluconate of chlorhexidine were the preferred embodiments.

Prior to the present invention, neither alexidine dihydrofluoride nor structurally related fluorides had been suggested for use in oral hygiene preparations based on a two-fold attack on dental caries, nor had the compound, alexidine dihydrofluoride and its preparation been fully and specifically described.

The objects of this invention are to provide: 1) process for the preparation of alexidine dihydrofluoride; 2) formulations for oral hygiene comprising as active ingredient alexidine dihydrofluoride in the form of toothpastes, mouth washes, mouth wash concentrates, and hydraulic jet oral irrigation solutions and concentrates; and 3) a method of treating dental plaque, calculus, caries and related periodontal disease.

Because oral hygiene practices and techniques vary widely from person to person, it is difficult to determine the optimum effective amount of alexidine dihydrofluoride at the site of activity. It has however been determined that tooth pastes, which may be any art-recognized formulation, should contain from 0.02 to 2 percent by weight of the active ingredient, and preferably from 0.1 to 0.5 percent by weight.

A mouth wash or formulation for use in an oral irrigation device should contain from 0.01 to 0.05 percent by weight, and preferably from 0.02 to 0.035 percent by weight.

Concentrates for mouth washes and for use in oral irrigation devices, (made possible by the unexpectedly high solubility of alexidine dihydrofluoride,) may be solutions of alexidine dihydrofluoride in any concentration above about 0.05 percent by weight, preferably from 0.1–10 percent, to be diluted at time of use with water to 0.01 to 0.05 percent.

Alternatively, the composition can be a solid composition, soluble in water, containing more than 0.05 percent by weight of alexidine dihydrofluoride, preferably from 0.1–10 percent, to be dissolved in water at time of use to form solutions of 0.01–0.05 percent alexidine dihydrofluoride.

Typical formulations are presented in the following examples, but it is understood that other formulations within the skill of the art are contemplated as being within the spirit and scope of the present invention.

EXAMPLE 1

Process for the Preparation of Alexidine Dihydrofluoride

Dissolve alexidine dihydrochloride (29.1 g., 0.05 mole) in 300 ml. of hot distilled water in a 400 ml. beaker. Add this hot solution to a stirring solution of 8.0 g. (0.2 mole) of NaOH in 150 ml. of water. Continue the stirring with cooling in an ice bath, during which time a yellow oil separates. When the temperature of the mixture drops to about 50°C., 150 ml. of chloroform is added and stirring is continued at room temperature. The mixture is transferred to a separatory funnel and the chloroform layer is separated from the aqueous layer. The chloroform phase is washed several times with distilled water, discarding the aqueous wash each time, until no significant test for the chloride ion is obtained in the aqueous washes. The chloroform extract is transferred to a plastic beaker, 50 ml. of acetone is added, and the mixture is filtered. To the filtrate is added 3.6 ml. (0.1 mole) of concentrated hydrofluoric acid with stirring. After precipitation of a white solid, excess acetone is added, and the suspension is stirred for 30 minutes. The solid is then collected by filtration, washed with acetone, and dried in vacuo to give 22.4 g. (82 percent yield) of alexidine dihydrofluoride, m.p. 216°–223°C.

Example 2

Toothpaste

| | % w/w |
|---|---|
| Alexidine dihydrofluroide | 0.10 |
| Glycerin | 25.50 |
| Water | 20.40 |
| Hydroxyethyl cellulose | 1.50 |
| Polyoxyethylene sorbitan monooleate | 2.00 |
| Calcium pyrophosphate | 49.50 |
| Flavor oil | 1.00 |

Mix the hydroxyethyl cellulose, glycerin, and polyoxyethylene sorbitan monooleate. Dissolve the alexidine dihydrofluoride in the water. Combine. With mixing, add the flavor oil, and then slowly disperse the calcium pyrophosphate. Mix until the resulting paste is homogeneous.

Example 3

Toothpaste

| | % w/w |
|---|---|
| Alexidine dihydrofluoride | 0.10 |
| Glycerin | 16.50 |
| Sorbitol, 70% solution | 10.00 |
| Water | 20.20 |
| Hydoxyethyl cellulose | 2.00 |
| Polyoxyethylene sorbitan monooleate | 2.20 |
| Insoluble sodium metaphosphate | 48.00 |
| Flavor oil | 1.00 |

Mix the hydroxyethyl cellulose, glycerin, sorbitol solution, and polyoxyethylene sorbitan monooleate. Dissolve the alexidine dihydrofluoride in the water. Combine. With mixing, add the flavor, and then slowly disperse the sodium metaphosphate. Mix until the resulting paste is homogeneous.

Example 4

Oral Irrigation Device Concentrate

| | % w/w |
|---|---|
| Alexidine dihydrofluoride | 1.00 |
| Polyoxyethylene sorbitan monooleate | 0.50 |
| Flavor | 1.00 |
| Water | 97.50 |

Mix all ingredients. Five ml. of the above liquid concentrate added to 250 ml. water in the reservoir of an oral irrigation device results in a concentration of approximately 0.02 percent alexidine dihydrofluoride.

Example 5

Oral Irrigation Device Concentrate

| | % w/w |
|---|---|
| Alexidine dihydrofluoride | 10.0 |
| Flavor on soluble carrier (10%) | 10.0 |
| Lactose | 80.0 |

Intimately mix the two ingredients. One gm. of the above solid concentrate added to 500 ml. water in the reservoir of an oral irrigation device results in a concentration of 0.02 percent alexidine dihydrofluoride.

Example 6

Mouthwash

| | % w/w |
|---|---|
| Alexidine dihydrofluoride | 0.02 |
| Glycerin | 10.00 |
| Ethyl alcohol, 95% | 12.00 |
| Water | 76.93 |
| Pepperment Oil | 0.05 |
| FD&C Red No. 2 (solution) | 1.00 |

Combine the alexidine dihydrofluoride, glycerin, color, and water. Dissolve the flavor oils in the ethyl alcohol. Combine.

What is claimed is:

1. A liquid oral hygiene composition for use in diluted form in an oral irrigation device for the prevention of dental plaque, calculus, gingivitis, caries and related periodontal disease comprising as active ingredient, alexidine dihydrofluoride in concentration 1 percent by weight.

* * * * *